US007250092B2

(12) United States Patent
Ferrell

(10) Patent No.: US 7,250,092 B2
(45) Date of Patent: Jul. 31, 2007

(54) ADHESIVE SIGN AND METHODS FOR APPLYING AND PRODUCING SAME

(76) Inventor: Randall W. Ferrell, 3129 Woodridge Dr., Hurst, TX (US) 76054

( * ) Notice: Subject to any disclaimer, the term of this patent is extended or adjusted under 35 U.S.C. 154(b) by 148 days.

(21) Appl. No.: 10/967,935

(22) Filed: Oct. 19, 2004

(65) Prior Publication Data

US 2005/0051263 A1 Mar. 10, 2005

Related U.S. Application Data

(63) Continuation-in-part of application No. 10/263,863, filed on Oct. 3, 2002, now abandoned.

(60) Provisional application No. 60/337,217, filed on Dec. 5, 2001.

(51) Int. Cl.
*B32B 37/00* (2006.01)

(52) U.S. Cl. ....................... 156/252; 156/250; 156/269

(58) Field of Classification Search ................ 156/252, 156/250, 269
See application file for complete search history.

(56) References Cited

U.S. PATENT DOCUMENTS 1,573,295 A * 2/1926 Bourgeois ................... 156/248
2,419,918 A * 4/1947 Scheetz, Jr. .............. 156/89.24
2,591,779 A 4/1952 Buck
3,297,508 A 1/1967 Jahp
3,315,387 A 4/1967 Heuser
3,914,891 A 10/1975 Brewer
4,015,352 A 4/1977 Prange
4,285,999 A * 8/1981 Olivieri et al. ............ 428/42.1
4,333,781 A 6/1982 Meulenberg
4,397,261 A * 8/1983 Jones ......................... 118/505
4,421,816 A * 12/1983 Arnold ....................... 428/202
4,467,525 A 8/1984 Logan et al.
4,835,872 A * 6/1989 Alcantara et al. ............ 33/18.1
4,909,884 A 3/1990 Wormser
5,225,260 A * 7/1993 McNaul et al. ............ 428/40.7
5,226,993 A 7/1993 Tukakoshi et al.
5,249,382 A 10/1993 Moynihan
5,262,612 A 11/1993 Momany et al.
5,277,736 A 1/1994 Logan
5,421,939 A * 6/1995 Scher et al. ................ 156/235
5,695,600 A 12/1997 Goin
6,563,078 B1 5/2003 Momany et al.

* cited by examiner

*Primary Examiner*—Chris Fiorilla
*Assistant Examiner*—Kimberly K McClelland
(74) *Attorney, Agent, or Firm*—Bracewell & Giuliani LLP

(57) ABSTRACT

A sign is formed from an adhesive-backed, vinyl sheet having a backing sheet. At least one graphic design or character is cut from the interior of the vinyl sheet. Tabs in the backing sheet extend between the edges of each character, the tabs maintaining the position of each graphic relative to the surrounding portion of the sheet. The sign is installed by adhering a portion of the graphics to the application surface, and then severing the tabs to free the vinyl graphics from the surrounding sheet. A device cuts the sign from the sheet and removes the waste material, reducing the labor required to produce the sign.

10 Claims, 5 Drawing Sheets

ADHESIVE SIGN AND METHODS FOR APPLYING AND PRODUCING SAME

CROSS-REFERENCE TO RELATED APPLICATION

This application is a continuation-in-part of application Ser. No. 10/263,863, filed Oct. 3, 2002 now abandoned, which claimed priority to provisional patent application Ser. No. 60/337,217, filed on Dec. 5, 2001, entitled "Adhesive Sign and Methods for Applying and Producing Same."

BACKGROUND OF THE INVENTION

1. Field of the Invention

This invention generally relates to adhesive signs and particularly relates to a sign using tabs for maintaining the orientation of characters within the sign. The invention also encompasses a method of production and of application of the tabbed sign.

2. Description of the Related Art

Graphics manufacturers commonly form adhesive signs by cutting graphics with conventional cutting and processing methods that have not changed or improved in many years. Current processing, even with computer-driven cutting devices, requires a high labor cost due to the time required for set up, cutting, and removal of waste materials. Additional steps may include adding application tape, assembly of the graphics, and packaging for shipping.

Currently, graphics manufacturers have people that remove the waste materials ("weeding") by hand when graphics are cut. It is common with these methods for damage to occur to the graphic during removal of the waste materials, requiring that the finished graphic be repaired or destroyed. These methods lead to a higher percentage of waste or spoilage, which, combined with the cost of the additional labor, greatly increases the cost of forming a graphic sign.

Current cutting and processing of cut graphics also requires several types of machines and equipment to complete the cutting and processing of cut graphics. The sheeting, cutting, weeding and addition of application tape (or premask) require large work areas with large tables for layout of cut materials for the processing steps. These factors combine to further increase the cost of forming signs.

When applying adhesive, cut-graphic signs comprising multiple characters, it is desirable to maintain the characters in proper alignment. With a sign formed using existing methods, an adhesive premask is often applied to the front surface of the sign for maintaining the relative positioning of portions of the sign during application. The graphics are applied to the application surface, and then the premask is removed, adding additional steps and cost to the manufacture and application phases.

Thus, there is a need for an improved type of cut-graphic sign and methods of forming and applying the signs that eliminate the weeding process and need for premasks, reducing the need for hand labor and reducing the types of machines and number of steps in processing a cut-graphic sign.

SUMMARY OF THE INVENTION

A sign is formed from a thermoplastic graphics sheet having an adhesive layer covered by a backing sheet. At least one graphic design or character is cut from the interior of the graphics sheet. The outline of the character is discontinuous in the backing sheet, with tabs that retain the interior portion of the character in the backing sheet. The tabs maintain the position of each graphic sheet character relative to the surrounding portion of the sheet. The tabs are formed in the backing sheet in two embodiments by cutting voids around the character with a laser. In these embodiments, tabs are also preferably formed in the thermoplastic graphics sheet. In a third embodiment, the tabs are formed by perforating the backing sheet. The outline of the character in the thermoplastic graphics sheet is preferably continuous in the third embodiment.

The sign is installed by adhering a portion of the graphics to the application surface, and then cutting the tabs to sever the graphics from the surrounding sheet. A device cuts the sign from the sheet and removes the waste material, reducing the labor required to produce the sign. In the third embodiment, no cutting is required. The perforations in the backing sheet allow the installer to pull the backing sheet portions of the character from the remaining portions of the backing sheet.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings.

DETAILED DESCRIPTION OF THE INVENTION

Figure 1:
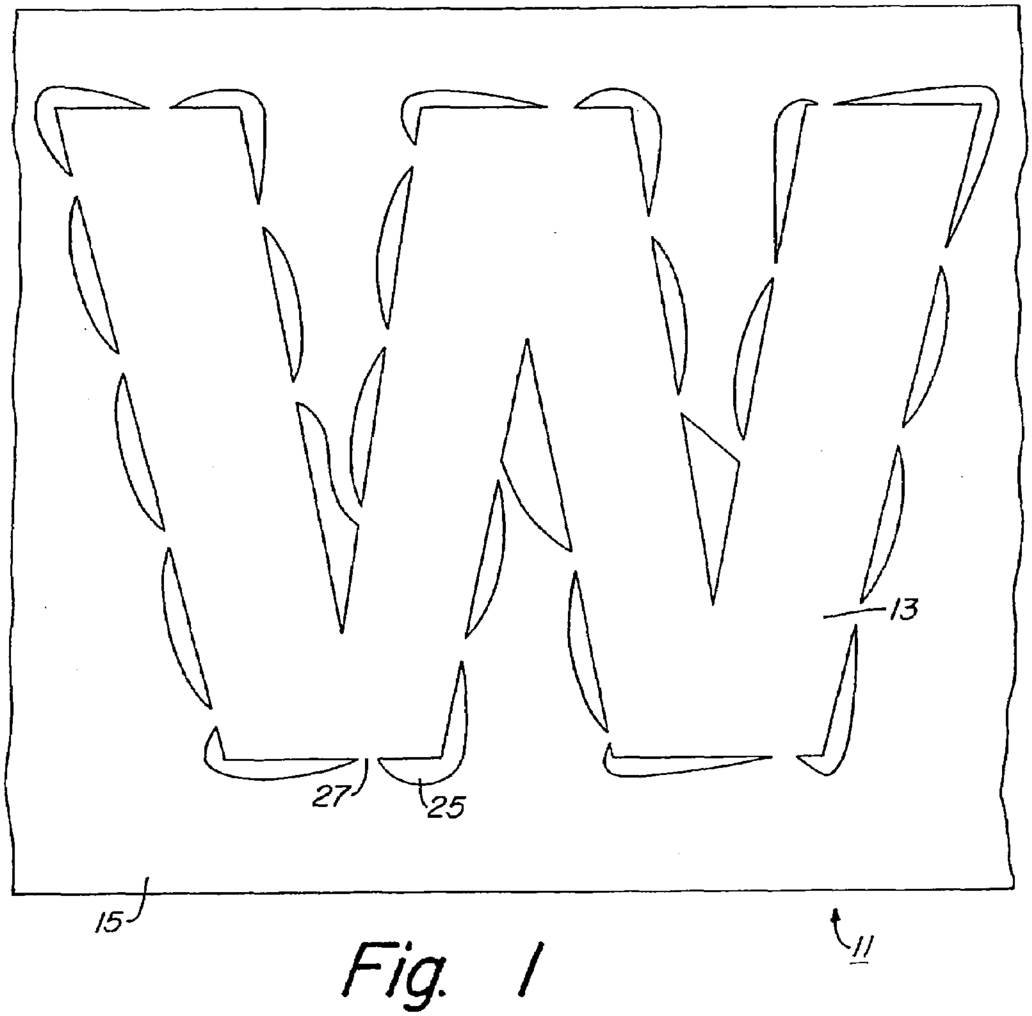
FIG. 1 is a front view of a portion of an adhesive-backed sign formed in accordance with the present invention.

Sign 11, a portion of which is shown in FIG. 1, comprises a plurality of individual characters 13 cut from a rectangular thermoplastic or vinyl graphics sheet 15, though only a "W" character is shown in FIG. 1. The word "character" is used broadly to include not only letters and numbers, but also logos and other graphical designs. Though shown as having an alphabetic letter, each character 13 can be any alphanumeric character or graphic design. Typically, cut vinyl graphics are applied on vehicles, windows, or other similar application surfaces. Each character 13 is preferably cut from a vinyl sheet 15 using a computer-controlled laser, but other cutting means may be used, such as hand cutting, die cutting, kiss cutting utilizing hand tools, cutting dies, thermal cutting dies, computer-controlled cutting knives, computer-controlled rougher cutting, and computer-controlled ultrasonic cutting.

Figure 2:
FIG. 2 is a side view of a portion of the sign of FIG. 1.

FIG. 2 is a cross-sectional view of a portion of sign 11, which has an adhesive 17 on the reverse side of vinyl sheet 15. A backing sheet 19 covers adhesive 17 until use, preventing adhesive 17 from adhering to surfaces before application and keeping dust and other contaminants away from adhesive 17. Backing sheet 19 is typically a paper product, but may be of other materials.

Figure 3:
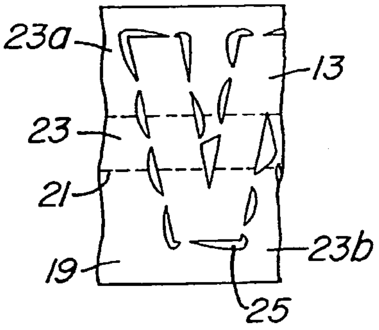
FIG. 3 is a rear view of the sign of FIG. 1.

FIG. 3 is a rear view of a portion of sign 11 showing backing sheet 19, which is preferably scored along lines 21 to form a central strip 23 along the width of backing sheet 19. Central strip 23 is preferably centered along the height of backing sheet 19. Strip 23 could vary in width and may be two inches, for example. Scoring backing sheet 19 to form strip 23 results in an upper backing strip 23*a* and a lower backing strip 23*b*.

Referring again to FIG. 1, voids 25 separate characters 13 from each other and from the remainder of vinyl sheet 15 and backing sheet 19 surrounding characters 13. Voids 25 are completely open, preferably, as they extend through vinyl sheet 15 and backing sheet 19. Voids 25 are separated by tabs 27 that connect characters 13 to vinyl sheet 15. As voids 25 are created by the cutting means used to produce sign 11, tabs 27 remain to maintain the positioning of characters 13 relative to the remainder of vinyl sheet 15. Voids 25 are preferably ¼ inch wide at their intersections with each character 13, though the width of voids 25 may be changed to any desired width. As shown in the figures, voids 25 are preferably formed through both vinyl sheet 15 and backing sheet 19, as in a die-cutting operation, though voids 25 may be formed only in vinyl sheet 15 using a kiss-cutting method.

Figure 6:
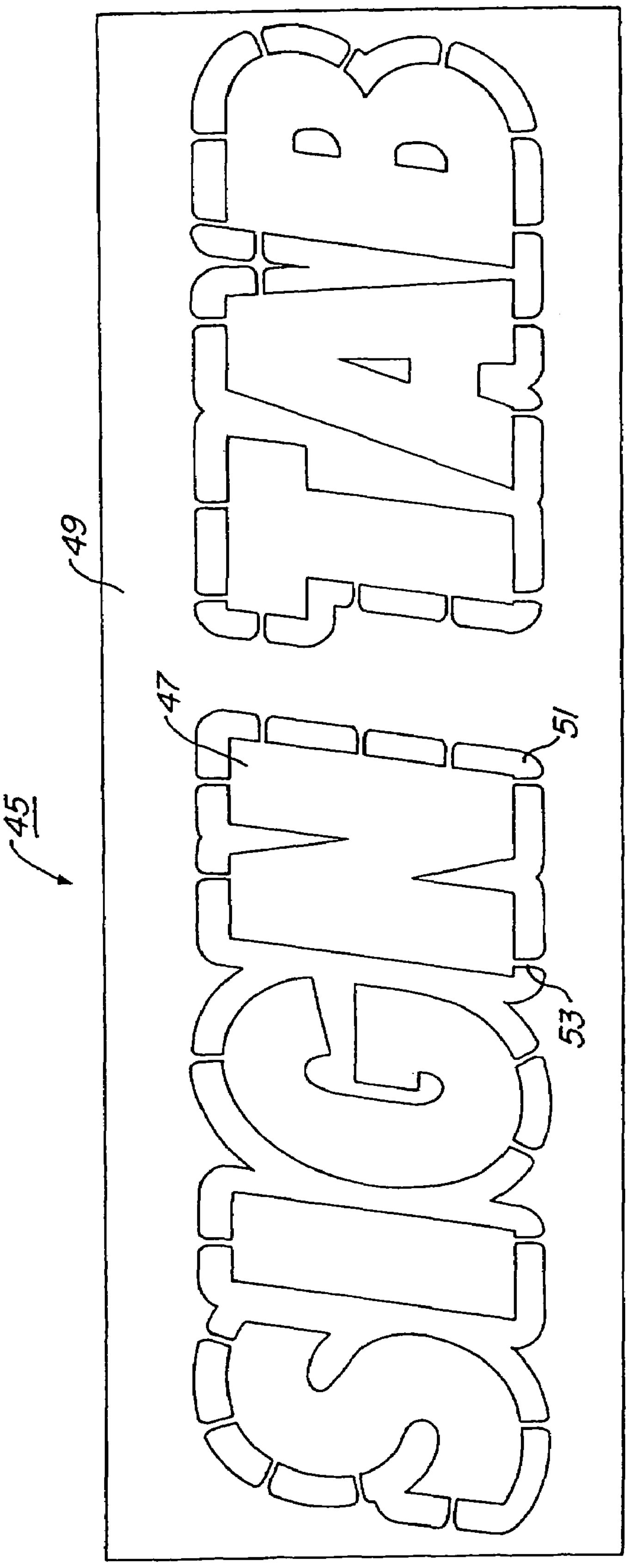
FIG. 6 is a front view of an alternate embodiment of an adhesive-backed sign formed according to the invention.

The shape of inner and outer edges of each void 25 may differ, as shown in FIG. 1, inner edges 25*a* defining the contour and the outer edge of each character 13, outer edges 25*b* being arcuate and defining the inner edge of the surrounding portion of vinyl sheet 15. Alternatively, as shown in FIG. 6 and described below, the inner and outer edges are parallel to each other.

Figure 4:
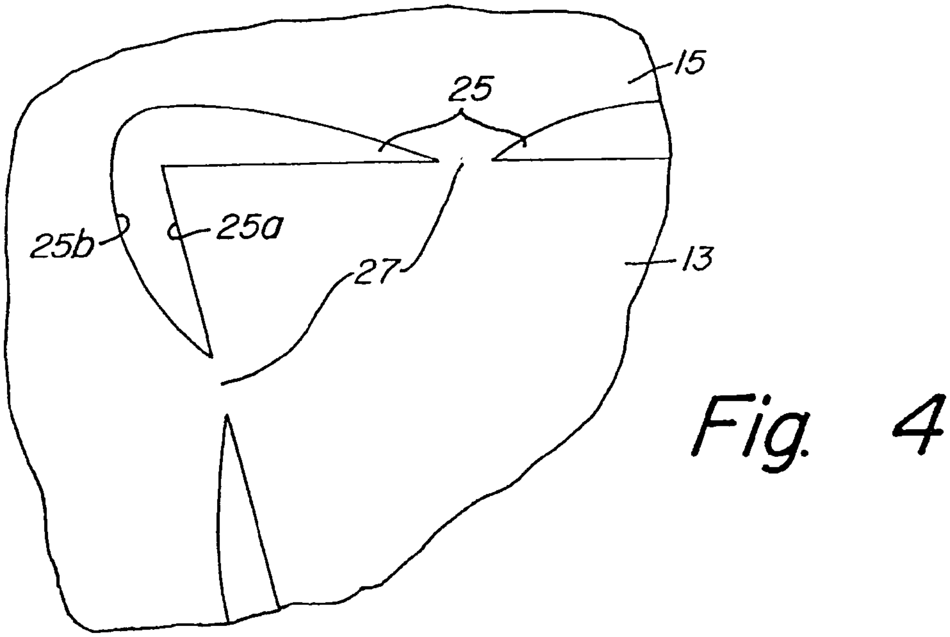
FIG. 4 is an enlarged front view of a portion of the sign of FIG. 1.

FIG. 4 is an enlarged view showing the upper left portion of "W" character 13, voids 25 being between character 13 and vinyl sheet 15, tabs 27 connecting character 13 to vinyl sheet 15. Tabs 27 can vary in quantity, width and length, and the size of tabs 27 may vary based on graphic size or type. The edges of voids 25 extending from tabs 27 are preferably arcuate, though tabs 27 can be straight (as shown in FIG. 6) or tapered. Where tabs 27 attach to vinyl sheet 15 or characters 13, tabs 27 may have radiussed corners, 90° corners, or a combination of these types of corners to accommodate better cutting speed. A minimum width and number of tabs 27 simplifies the task of application of a completed sign 11, but the width and number of tabs 27 must be sufficient to hold each character 13 during handling and until characters 13 are hand cut during application of sign 11. Tabs 27 eliminate the need for an adhesive premask adhered to the front of characters 13, though a premask can be used, if desired.

Figure 5:
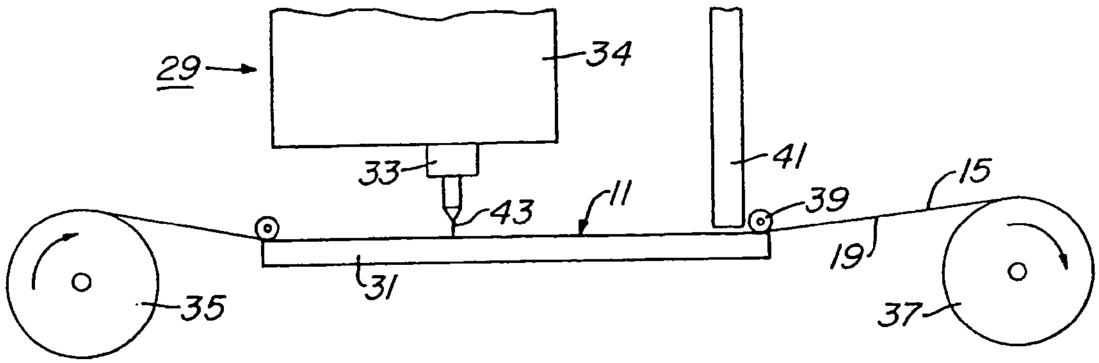
FIG. 5 is a side view of a device according to the invention and used to form the sign of FIG. 1.

To form sign 11, the preferred method uses a laser to cut vinyl sheet 15 and backing sheet 19, cutting characters 13 from vinyl sheet 15 and creating voids 25. FIG. 5 shows cutting tool 29, comprising planar table 31, computer-controlled laser cutter 33 mounted on gantry 34, cylindrical feed roll 35, cylindrical take-up roll 37, and tension rollers 39. In addition, the open end of a vacuum conduit 41, which is preferably at least as wide as vinyl sheet 15, is positioned near table 31 for removing waste material cut from vinyl sheet 15 and backing sheet 19. Laser cutter is preferably a 150 W laser, though laser of other wattage may be used. Feed roll 35 and take-up roll 37 are typically 48 inches wide, though rolls of different sizes may be used to accommodate different sizes of vinyl sheets 15.

In operation, vinyl sheet 15 and its attached backing sheet 19 unrolls from feed roll 37 and moves onto the upper surface of table 31 to be positioned under laser cutter 33. Tension rollers 39 maintain tension on vinyl sheet 15 and backing sheet 19 for locating them in position against the upper surface of table 31. Laser cutter 33 produces a laser beam 43, which cuts through selected portions of vinyl sheet 15 and backing sheet 19 to form characters 13 (FIG. 1) in sign 11 as gantry 34 translates cutter 33. Sign 11 is then rolled toward take-up roll 37 and passes under vacuum conduit 41, through which vacuum pressure is applied. Waste material from voids 25 is pulled into vacuum conduit 41, weeding sign 11 prior to sign 11 being rolled onto take-up roll 35. Sign 11 can be removed from take-up roll 37 prior to transport of sign 11, or take-up roll 37 can be removed from tool 29 for transporting sign 11.

Referring again to FIGS. 1 and 3, to install sign 11 using the preferred method, an installer uses adhesive tape to attach the upper edge of vinyl sheet 15 to the application surface (not shown) onto which sign 11 will be adhered. Backing sheet 19 will be in contact with the application surface. Because characters 13 of sign 11 are still held within the remainder of vinyl sheet 15 with tabs 27, the straight edges of vinyl sheet 15 may be used to align sign 11 in the desired position and orientation, all characters 13 being aligned together. The installer cuts tabs 27 along the area of central backing strip 23 of backing sheet 19 at their intersections with each character 13. The installer hinges or folds sign 11 upward, and central backing strip 23 on each character 13 is removed. The exposed portions of adhesive 17 on characters 13 are pressed and adhered to the application surface, which affixes characters 13 in their relative positions. Then, remaining tabs 27 are severed at their intersection with each character 13, disconnecting each character 13 from vinyl sheet 15, which is removed. The upper and lower portions of each character 13 can then be hinged or folded away from the application surface, allowing strips 23*a* and 23*b* of backing sheet 19 on each character 13 to be removed. The upper and lower portions of characters 13 are then adhered to the application surface. Preferably, the cutting of remaining tabs 27 and the adhering of the upper and lower portions of characters 13 are done one character 13 at a time.

FIG. 6 shows a sign 45 formed using a variation on the method described above to cut characters 47 from vinyl sheet 49. Voids 51 and tabs 53 are cut using a tool, such as tool 29 in FIG. 5, but tabs 53 are thin strips extending from the outer edges of voids 51, tabs 53 being approximately perpendicular to characters 47 at their intersections. Sign 45 may be desirable or required for some applications, though the time required for cutting voids 51 is greater than that required for cutting voids 25 (FIG. 1).

Figure 7:
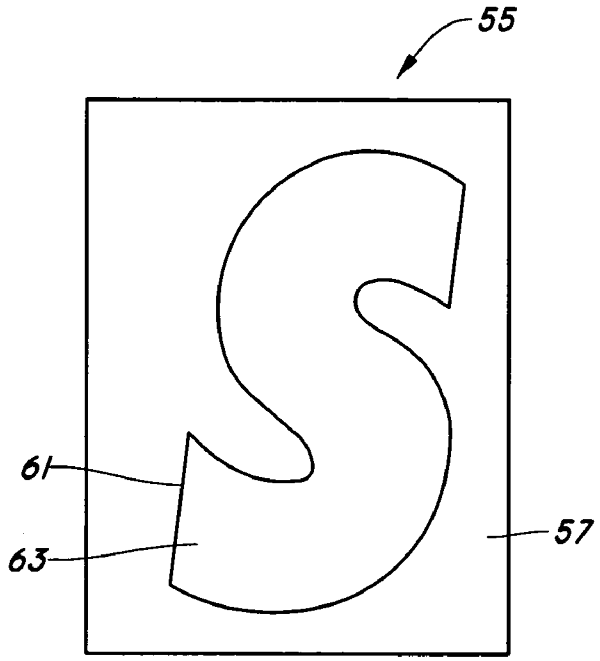
FIG. 7 is a front view of a second alternate embodiment of an adhesive-backed sign formed according to the invention.
Figure 8:
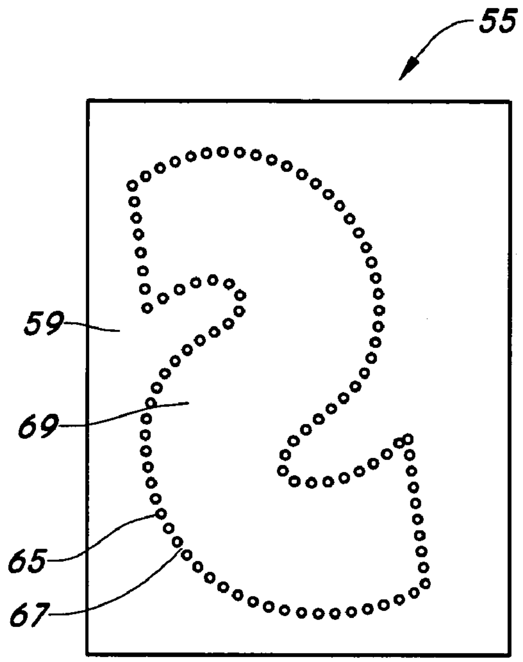
FIG. 8 is a back view of the sign of FIG. 7.
Figure 9:
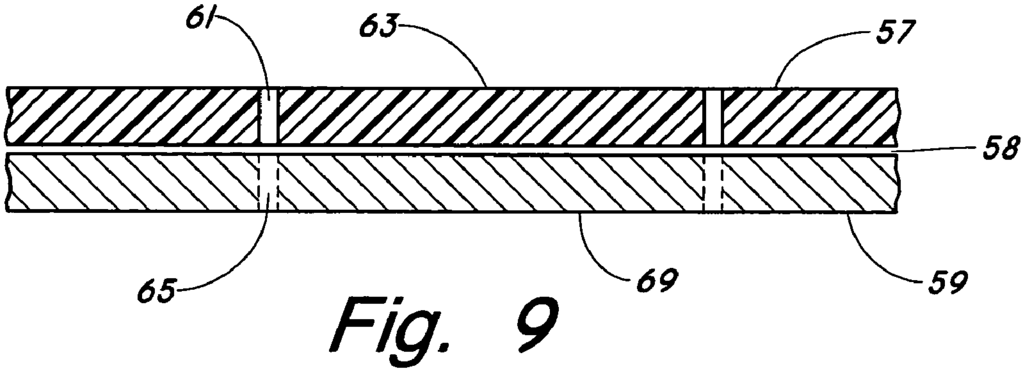
FIG. 9 is an enlarged sectional view of a portion of the sign of FIG. 7.
Figure 10:
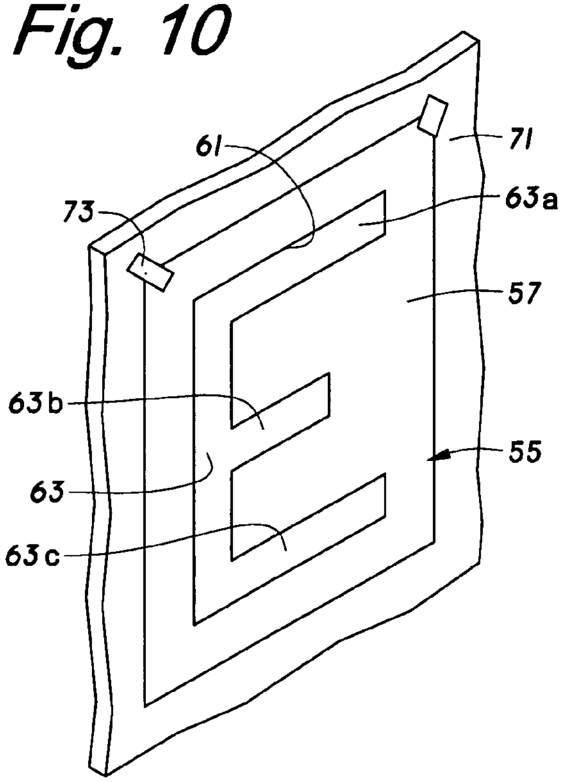
FIG. 10 is a perspective view of the front of a sheet assembly in accordance with the embodiment of FIGS. 7-9, but showing the graphics character to be the letter E and showing the upper end of the sheet assembly taped to an application surface.

FIGS. 7-9 show a third embodiment of a graphics sheet assembly 55 having a vinyl graphics sheet 57. A pressure-sensitive adhesive layer 58 is located on the back side of vinyl sheet 57. A protective backing sheet 59 covers adhesive layer 58. A continuous outline 61 is cut through vinyl sheet 57 to define a graphics sheet or vinyl character 63. There are no tabs in this embodiment in vinyl sheet 57, and vinyl character 63 is completely detached from the remaining portions of vinyl sheet 57.

A discontinuous outline is formed by perforations 65 in backing sheet 59. Perforations 65 define tab portions 67 between each aperture that retain a backing sheet character 69 with the remaining portions of backing sheet 59. Backing sheet character 69 has an outline that mates exactly with vinyl character 63 because perforations 65 coincide with continuous outline 61. Vinyl character 63 is removably attached to backing sheet character 69 by adhesive layer 58, thus backing sheet character 69 retains vinyl character 63 with the remaining portions of vinyl sheet 57.

Graphics sheet assembly 55 is manufactured generally as described in connection with the first embodiment, except that in the preferred method, the laser or cutting knife first makes a kiss cut through vinyl sheet 57 only to form continuous outline 61. Then, in a second pass, the laser or knife traces moves along the previously formed continuous outline 61 to form perforations 65 in backing sheet 59. Backing sheet 59 could optionally have scoring to form multiple strips as illustrated in FIG. 3. Typically, there would be more than one vinyl character 63 on one sheet assembly 55, as in the other embodiments.

Figure 11:
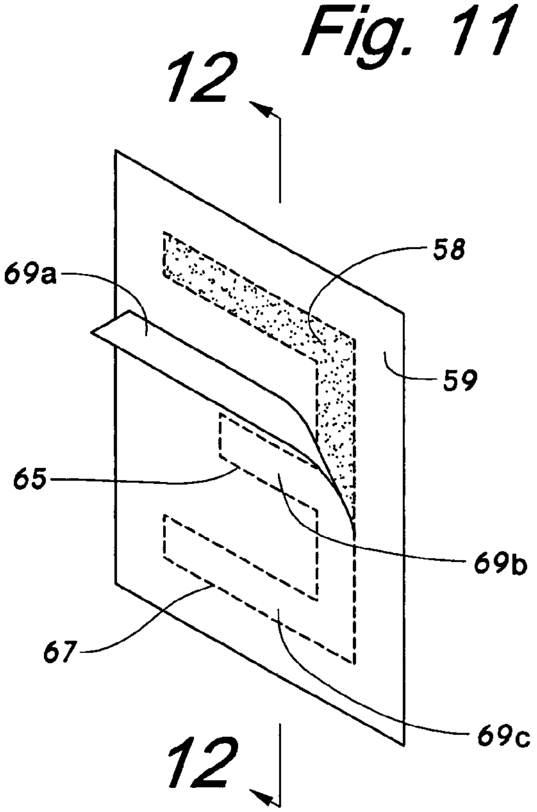
FIG. 11 is a perspective view of the back side of the sheet assembly of FIG. 10 with the application surface not shown and showing a portion of the backing sheet being peeled from the remaining portion of the backing sheet.
Figure 12A:
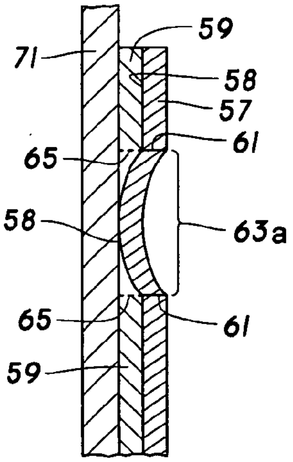
FIGS. 12A-C comprise a sectional view of the upper, lower and middle portions of the sheet assembly as shown in FIG. 11 and an application surface.
Figure 12B:
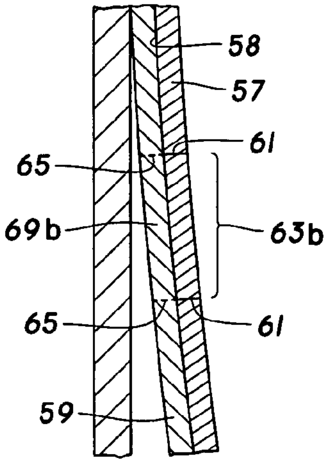
Figure 12C:
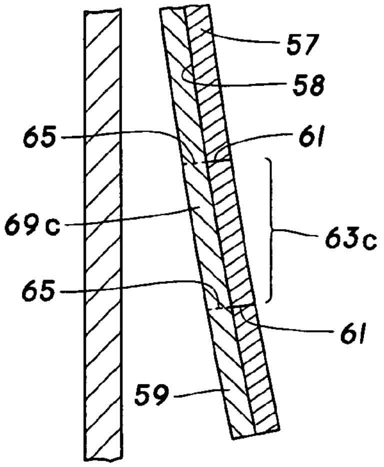

Referring to FIGS. 10-12C, to install vinyl character 63, which in the example is the letter E, the installer tapes graphics sheet assembly 55 to an application surface 71 (FIG. 12A-C) using tape 73, with backing sheet 59 in contact with application surface 71. Tape 73 is shown engaging a margin portion of vinyl graphics sheet 57 above vinyl character 63. As shown in FIG. 12A, a margin portion of backing sheet 59 outside of backing sheet character 69 is in contact with application surface 71. Application surface 71 is not shown in FIG. 11. The installer then peels off at least part of backing sheet character 69 by breaking tabs 67 of perforations 65, as illustrated in FIG. 11. The upper horizontal leg 69*a* and part of the vertical leg of the E character is shown being peeled away from backing sheet 59 in FIG. 11. The margin of backing sheet 59 above upper horizontal leg 69*a* remains in contact with application surface 71 while upper horizontal leg 69*a* is being peeled away. There is no need to cut tabs 67 because they are very small. The removal of a portion of backing sheet character 63 exposes adhesive layer 58 on vinyl character 63. The installer presses this exposed portion of adhesive 58 to application surface 71 as shown in FIG. 12A. Note in FIGS. 12B and 12C that the middle horizontal leg 63*b* and lower horizontal leg 63*c* of the E character are not yet bonded to application surface 71 because backing portions 69*b* and 69*c* have not yet been peeled off The installer then peels off more or all of backing sheet character 69 by breaking more tabs 67 of perforations 65, and presses additional or all portions of vinyl character 63 against applications surface 71. Optionally, the installer could peel off all of backing sheet character 69 at one time in the case of small vinyl characters 63.

When all of the vinyl characters 63 are installed, the installer removes the marginal or remaining portions of graphics sheet assembly 55. Those marginal portions are not fastened to vinyl character 63 because of the continuous cut 61 around character 63. Those marginal portions are also not stuck to application surface 71 because the only portions of adhesive layer 58 that contacted application surface 71 are those portions on the back side of vinyl characters 63. The installer does not need to cut any portions of vinyl sheet 57 because all of the vinyl characters 63 have been fully cut out from vinyl sheet 57 at the manufacturing facility.

There are several advantages to using the signs and method of forming signs described herein. The present invention provides a simple, fast method for production of quality signs and graphics for a variety of applications. The method can be used with pressure sensitive, positionable, re-positionable and pressure activated adhesives used with vinyl materials. The invention eliminates the need for, and cost of, application premasks. This system can greatly reduce or eliminate the removing of waste materials by hand after the cutting process of the graphic is completed, greatly reducing the throughput time to produce a cut graphic.

Also, the method of application using tabbed signs improves accuracy and stability of graphics during application by holding letters, numbers and/or graphics together in a panel. This eliminates the existing method used with large die cut graphics where individual letters, numbers, and graphics are installed separately. This prior-art method makes it very difficult to align graphics correctly and takes more labor time to install. This new tab system will eliminate these existing requirements and reduce labor time.

The method of production can improve worker safety, since roll feed or sheet feed computer driven cutting equipment eliminate the need to hand feed die cutting equipment traditionally used to produce a graphic. Also, the signs may be transported on the take-up rolls.

While the invention has been shown or described in only some of its forms, it should be apparent to those skilled in the art that it is not so limited, but is susceptible to various changes without departing from the scope of the invention. For example, the laser beam may be a beam that vaporizes the material from the voids. Because of the vaporization of material from the voids, the weeding step is eliminated. Also, the vacuum conduit could alternatively channel compressed air toward the sign for blowing the waste material out of the voids. As mentioned above, it is also possible to form signs of the invention using a kiss-cutting method, though the weeding step is not eliminated.

I claim:

1. A method of applying graphics to an application surface, the method comprising:

(a) providing a thermoplastic graphics sheet with a back surface having an adhesive layer covered by a backing sheet;

(b) cutting a continuous outline in the graphics sheet to define a graphics sheet character, the continuous outline completely severing the graphics sheet character from the graphics sheet, resulting in a marginal portion of the graphics sheet on an opposite side of the continuous outline from the graphics sheet character;

(c) along the continuous outline in the graphics sheet, cutting a discontinuous outline in the backing sheet to define a mating backing sheet character adhered to the graphics sheet character by the adhesive layer, resulting in a marginal portion of the backing sheet on an opposite side of the discontinuous outline from the backing sheet character, the discontinuous outline in the backing sheet having a plurality of tab portions that retain the backing sheet character with the marginal portion of the backing sheet;

(d) positioning at least part of the marginal portion of the backing sheet temporarily in contact with the application surface, then severing part of the tab portions of the discontinuous outline of the backing sheet character, removing part of the backing sheet character from the graphics sheet character and adhering a portion of the back surface of the graphics sheet character to the application surface with the adhesive layer while the marginal portion of the backing sheet remains temporarily in contact with the application surface; then (e) severing the remaining tab portions of the discontinuous outline of the backing sheet character, then removing the remaining portion of the backing sheet character from the graphics sheet character, and adhering the remaining portion of the back surface of the graphics sheet character to the application surface with the adhesive layer; then (f) removing from the application surface the marginal portions of the backing sheet and the graphics sheet, which remain adhered to each other.

2. The method of claim 1, wherein:

step (b) comprises first making the continuous outline in the graphics sheet, then after completion of the continuous outline, cutting the discontinuous outline in the backing sheet.

3. The method of claim 1, wherein:

step (c) comprises forming perforations in the backing sheet to define the discontinuous outline and the tab portions.

4. The method of claim 1, wherein positioning at least part of the marginal portion of the backing sheet temporarily in contact with the application surface in step (d) further comprises:

taping the graphics sheet to the application surface with said at least part of the marginal portion of the backing sheet in contact with the application surface.

5. The method of claim 1, wherein the backing sheet is scored in multiple strips that extend along the backing sheet character; and steps (d) through (e) are performed separately and sequentially for each of the strips.

6. The method of claim 1, wherein:

steps (b) and (c) are performed by drawing a roll of graphics sheet backed with a backing sheet across a work surface to a take-up roll and cutting the continuous outline and the discontinuous outline of the character while the graphics sheet and backing sheet are located over the work surface.

7. A method of applying graphics to an application surface, the method comprising:

(a) providing a thermoplastic graphics sheet with a back surface having an adhesive layer covered by a backing sheet;

(b) cutting an outline in the graphics sheet to define a graphics sheet character, resulting in a marginal portion of the graphics sheet that forms no part of the graphics sheet character and is on an opposite side of the outline from the graphics sheet character;

(c) perforating the backing sheet along the outline to form a mating backing sheet character that is retained with the backing sheet by the perforations, resulting in a marginal portion of the backing sheet that forms no part of the backing sheet character and is on an opposite side of the perforations from the backing sheet character;

(d) adhering the marginal portions of the graphics sheet and the backing sheet to the application surface with at least part of a back surface of the marginal portion of the backing sheet in contact with the application surface, then removing part of the backing sheet character from the graphics sheet character by breaking at least some of the perforations, exposing a part of the surface of the graphics sheet character, then pressing the exposed part of the back surface of the graphics sheet character against the application surface to adhere the exposed part of the graphics sheet character to the application surface while the marginal portions of the graphics sheet and the backing sheet remain adhered to each other and to the application surface; then (e) removing the remaining portion of the backing sheet character from the remaining portion of the graphics sheet character by breaking the remaining perforations and pressing the remaining portion of the back surface of the graphics sheet character to the application surface to adhere the remaining portion of the graphics sheet character to the application surface while the marginal portions of the graphics sheet and the backing sheet remain adhered to each other and to the application surface; then (f) removing the marginal portions of the graphics sheet and the backing sheet from the application surface.

8. The method of claim 7, wherein the backing sheet is scored in multiple strips that extend along the backing sheet character; and steps (d) through (e) are performed separately and sequentially for each of the strips.

9. The method of claim 7, wherein:

steps (b) and (c) are performed by drawing a roll of graphics sheet backed with a backing sheet across a work surface to a take-up roll and cutting the outline and perforating the backing sheet sequentially while the graphics sheet and backing sheet are located over the work surface.

10. A method of applying graphics to an application surface, the method comprising:

(a) providing a thermoplastic graphics sheet with a back surface having an adhesive layer covered by and adhered to a backing sheet;

(b) cutting an outline in the graphics sheet to define a graphics sheet character, the marginal portion of the graphics sheet being on an opposite side of the outline from the graphics sheet character;

(c) perforating the backing sheet along the outline to form a mating backing sheet character that is retained with a marginal portion of the backing sheet by the perforations, the marginal portion of the backing sheet being on an opposite side of the perforations from the backing sheet character;

(d) taping to the application surface the marginal portions of the graphics sheet and the backing sheet while still adhered to each other, with at least part of a back surface of the marginal portion of the backing sheet in contact with the application surface, then removing the backing sheet character from the graphics sheet character by breaking the perforations, exposing the back surface of the graphics sheet character, then while the marginal portions of the graphics sheet and the backing sheet remain adhered to each other and taped to the application surface, pressing the back surface of the graphics sheet character against the application surface to adhere the graphics sheet character to the application surface; then (e) removing the marginal portions of the graphics sheet and the backing sheet from the application surface.

* * * * *